(12) United States Patent
Anderson et al.

(10) Patent No.: US 7,341,872 B1
(45) Date of Patent: Mar. 11, 2008

(54) MULTIAUTOCLAVE WITH SET OF VESSELS FOR COMBINATORIAL SYNTHESIS OF ZEOLITES AND OTHER MATERIALS

(75) Inventors: Brent J. Anderson, Palatine, IL (US); Ralph D. Gillespie, Gurnee, IL (US); Maureen L. Bricker, Buffalo Grove, IL (US)

(73) Assignee: UOP LLC, Des Plaines, IL (US)

( * ) Notice: Subject to any disclaimer, the term of this patent is extended or adjusted under 35 U.S.C. 154(b) by 267 days.

(21) Appl. No.: 10/834,648

(22) Filed: Apr. 29, 2004

(51) Int. Cl.
G01N 35/00 (2006.01)
G01N 35/02 (2006.01)
G01N 1/00 (2006.01)
G01N 15/06 (2006.01)
G01N 33/00 (2006.01)

(52) U.S. Cl. .............. 436/43; 422/50; 422/58; 422/62; 422/63; 422/68.1; 422/81; 422/82; 422/102; 422/103; 422/104; 422/129; 422/134; 422/136; 436/47; 436/48; 436/174

(58) Field of Classification Search .......... 422/50, 422/58, 62, 63, 68.1, 81, 82, 102, 103, 104, 422/129, 134, 136; 436/43, 47, 48, 174
See application file for complete search history.

(56) References Cited

U.S. PATENT DOCUMENTS

| | | | |
|---|---|---|---|
| 3,048,481 A | 8/1962 | Eastman | 48/206 |
| 3,130,007 A | 4/1964 | Breck | 23/113 |
| 3,396,865 A | 8/1968 | Elmes et al. | 220/13 |
| 4,014,657 A | 3/1977 | Gryaznov et al. | 23/288 R |
| 4,554,136 A | 11/1985 | Chai et al. | 422/209 |
| 5,013,531 A | 5/1991 | Snyder et al. | 422/245 |
| 5,096,676 A | 3/1992 | McPherson et al. | 422/245 |
| 5,282,543 A | 2/1994 | Picozza et al. | 220/255 |
| 5,312,506 A | 5/1994 | Omino | 117/83 |
| 5,322,591 A | 6/1994 | Harris et al. | 117/71 |
| 5,362,325 A | 11/1994 | Shiraishi et al. | 117/201 |

(Continued)

FOREIGN PATENT DOCUMENTS

EP 0 434 890 A1 3/1991

(Continued)

OTHER PUBLICATIONS

Krchnak, V., Vagner, J.; Peptide Res. 3,182 (1990).

*Primary Examiner*—Brian Sines
(74) *Attorney, Agent, or Firm*—Maryann Maas

(57) ABSTRACT

A vessel arrangement having a base and multiple vessels suited for simultaneously conducting a plurality of isolated experimental reactions or treatments at atmospheric process conditions or elevated temperatures and pressure condition has been developed. A component of a first material is introduced into one independent vessel through an opening in its top of the first vessel and another component of a second material is introduced into a different independent vessel through its top. Both vessels are removably located about a base at different first locations. Transformation of the components in the vessels then occurs to produce different materials therein. After completion of the experiments a displacement medium simultaneously urges the vessels from their respective locations about the base for discard or reuse after any necessary cleaning. Typically at least one property of the materials from the vessels is determined either within the vessel or after recovery of the materials.

38 Claims, 9 Drawing Sheets

U.S. PATENT DOCUMENTS

| | | | |
|---|---|---|---|
| 5,400,741 A | 3/1995 | DeTitta et al. | 117/206 |
| 5,405,586 A | 4/1995 | Koves | 422/218 |
| 5,424,213 A | 6/1995 | Mougin | 436/63 |
| 5,476,635 A | 12/1995 | Stoker | 422/26 |
| 5,503,805 A * | 4/1996 | Sugarman et al. | 422/131 |
| 5,505,916 A | 4/1996 | Berry, Jr. | 422/300 |
| 5,531,185 A | 7/1996 | Asano et al. | 117/206 |
| 5,741,463 A | 4/1998 | Sanadi | 422/101 |
| 5,785,927 A * | 7/1998 | Scott et al. | 422/104 |
| 5,792,430 A * | 8/1998 | Hamper | 422/131 |
| 6,056,926 A * | 5/2000 | Sugarman et al. | 422/131 |
| 6,132,686 A * | 10/2000 | Gallup et al. | 422/130 |
| 6,165,778 A * | 12/2000 | Kedar | 435/289.1 |
| 6,455,316 B1 * | 9/2002 | Turner et al. | 436/37 |
| 6,458,067 B1 | 10/2002 | Dorin et al. | 494/37 |
| 6,485,692 B1 * | 11/2002 | Freitag et al. | 422/130 |
| 6,528,026 B2 * | 3/2003 | Hajduk et al. | 422/198 |
| 6,821,486 B1 * | 11/2004 | Akporiaye et al. | 422/102 |

FOREIGN PATENT DOCUMENTS

| | | |
|---|---|---|
| EP | 0 553 539 A1 | 4/1993 |
| EP | WO 01/0289 A1 | 1/2001 |
| WO | WO 95/12608 | 11/1995 |
| WO | WO 96/11878 | 4/1996 |
| WO | WO 97/35198 A1 | 9/1997 |
| WO | WO 98/36826 A1 | 8/1998 |
| WO | WO 01/58583 A1 | 8/2001 |
| WO | WO 02/07873 A2 | 1/2002 |

* cited by examiner

MULTIAUTOCLAVE WITH SET OF VESSELS FOR COMBINATORIAL SYNTHESIS OF ZEOLITES AND OTHER MATERIALS

FIELD OF THE INVENTION

The present invention relates to a vessel arrangement having a base and multiple vessels suited for simultaneously conducting a plurality of isolated experimental reactions or treatments at atmospheric process conditions or elevated temperatures and pressure condition.

BACKGROUND OF THE INVENTION

In recent years, new, automated methods for the systematic preparation of new compounds, so-called "combinatorial techniques" have been developed. A wide variety of methodologies, tools and techniques wear the label of combinatorial methods. Generally these methods seek to accelerate the discovery of new materials and the application of new and known materials to new uses by increasing the number and rapidity of material tests though reductions in the size of material samples. A particular type of combinatorial methods focuses on the creation and/or analysis of arrays of materials at discrete locations on a substrate of some type. The substrates often comprise a base having regions defines by depressions, wells, walls of other structural means to separate the regions and keep the different materials in the arrays isolated for synthesis and analysis.

The size of the materials samples in the regions are of necessity kept small to achieve the objective of such arrays in the combinatorial methodology. Accordingly the diameter of the regions seldom exceeds 15 mm and usually presents regions of much smaller size. The small size of these regions can pose contamination problems. Contamination whether detected or undetected can interfere with the usefulness of such arrays by corrupting the data obtained from the material samples thereby leading to false conclusions that waste time and resources. Consequently reuse of a substrate such as a base that receives material directly on its surface requires thorough cleaning and/or treatment to avoid the presence of any contaminants from previous experiments. Since the regions are by definition small, intensive and thorough cleaning of the small areas can present a challenge. Moreover the composition of the substrate or base may exacerbate the problems. The use of easily machinable or formable materials facilitates the manufacture of the small structures on the surface of the base that define the vast number of small regions needed for such arrays. However easily machinable and formable materials are typically less susceptible to the harsh conditions needed to get the contaminants out of the small regions.

It is already known to synthesize a multitude of material samples in arrays of small vessels. For example, it is known to produce various metal oxides in small vessels having the form of individual crucibles retained by a base. The use of individual vessels allows their disposal or intensive cleaning once all experimental steps with the material contained therein are concluded. However, many of the synthesis operations, treatments steps and analysis of a material may require movement of the arrays. So on one hand the vessels must remain fixed in the base throughout such procedures that may in addition to movement between pieces of equipment require shaking stirring or agitation in the equipment. But at the same time the vessel must not become so fixed in the base or substrate that they are not readily removed for disposal. Fitting vessels into a base with a tight tolerance may prevent their removal after completion of the experiment. Moreover, certain treatment steps may create minor distortion of the vessels or the base that binds them together by the completion of the experiment.

Such conditions occur in the synthesis of many materials. One example of such materials, zeolites, are prepared by so-called hydrothermal synthesis at temperatures ranging from 100° C. to 200° C. requiring crystallization times of one hour or more. For syntheses being carried out at temperatures that are higher than the boiling point of the solvent, it is necessary to use pressure vessels, and these have to be suitable for the temperature and pressure used during the operation. This further requires the sealing of the vessels in a manner that prevents contamination between the materials undergoing synthesis.

Zeolite syntheses are usually performed in strongly alkaline media, often at pH>14, and the reaction mixture will often contain toxic chemicals such as, e.g., fluoride. Conventionally, syntheses that may be performed at temperatures lower than 110° C. are carried out in polymer bottles, often Teflon™ (tetrafluoroethylene), while reactions at higher temperatures require steel autoclaves, perhaps lined with Teflon™. Having a cost effective combinatorial method for such syntheses is quite useful since the price of an autoclave of this type with the required safety details is typically of the order of about 1,000 United States dollars or higher. Furthermore, such an autoclave will weigh from 1 kilogram and upwards, and all of these elements represent limitations regarding the number of syntheses that may be performed in most laboratories in the course of one year.

Zeolite synthesis is often carried out by keeping the synthesis mixture at around 100° C. for at least 6 h. At these moderate temperatures sealed chambers are necessary in order to avoid drying out of the synthesis mixture. U.S. Pat. No. 3,130,007 A exemplifies conventional zeolite synthesis. Common to all the synthesis procedures mentioned and for all other known synthesis procedures for the preparation of zeolites on a laboratory scale with the purpose of discovering new zeolites or to optimize existing zeolites is that these are performed in a cumbersome and expensive manner by having to separately prepare each reaction mixture, which typically consists of 4-7 reagents, and by adding the reagents one by one. In many other examples the synthesis of zeolites and other molecular sieves needs temperatures well above 100° C., so that steel pressure vessels or the like are required.

New, combinatorial techniques which may be used for liquid phase synthesis at temperatures above approximately 100° C. have been disclosed in WO 02/07873 that provides the synthesis to be performed in a hermetically sealed vessel at elevated pressures. There is, e.g., a known design called "multiblock", see Krchnak, V.; Vagner, J. Peptide Res. 1990, 3,182, consisting of i) a Teflon™ block holding 42 reactors, polypropylene syringes equipped with polymer filters, ii) a vacuum adapter connecting each reactor to a vacuum line (not described in detail) which enables rapid washing in an apparatus for continuous flow, iii) two Teflon™ plates with 42 stoppers to which the Teflon™ block is fastened during use, and iv) a glass cover used during homogenization. The problem with this design is that the reactors which are made of glass and which do not have protected sidewalls may be used only at low pressures and not in strongly alkaline solutions.

Until recently there has been no available literature describing methods or equipment for using arrays that might be used for practical work to sufficiently retain vessels in the array to perform combinatorial experimentation while providing facile withdrawal of the vessels for replacement in the substrate or base. Zeolite synthesis can be particularly problematic inasmuch as such syntheses almost without exception require hydrothermal treatment of a solution or gel with a relatively high content of water and often high contents of organic compounds in a closed chamber under elevated temperatures and high pressure.

WO 98/36826 discloses a system for screening of synthesis conditions for the preparation of zeolites and other non-carbon materials requiring hydrothermal conditions in the temperature range of 100° C. to 250° C. Some of the parameters that have been made more cost efficient with the multiautoclave of WO 98/36826 include: reduced size of the separate reaction chambers and increased number of reaction chambers; reduced use of reactants; automated addition of reactants, for instance by a pipetting machine which makes quick and exact addition of all liquid reactants possible; and devices allowing automated analysis with X-ray diffraction and automatic identification of known crystalline phases. WO 98/36826 has also disclosed automated equipment for larger synthesis series and preparation formulations based on mixtures of different liquids/solutions with varying reactant ratios.

The WO 98/36826 invention is a pressure and temperature reactor vessel comprising a central block having a multitude of perforations. The perforations are throughgoing perforations, cavities or other form of holes permanently closed at one end. A cover engages the central block to seal the open ends of the perforations and form a multitude of chambers. A sealing means, operatively associated with the cover together form a pressure tight seal when a locking means holds cover in engagement with the sealing means to make reaction chambers pressure tight. Applications for the WO 98/36826 invention may, in addition to zeolite synthesis, be in any field of activities within research and development connected to products where at least one production step comprises the mixing of different liquids, e.g., in the fields of organic and inorganic syntheses, paint production, formulation of fuels, food industry, etc., and, furthermore, applications within clinical testing, dissolution and digestion of samples with acid etc. where a liquid reactant is added to a liquid or solid, or a solid is added to a liquid. The invention of WO/9836826 is most useful where open vessels cannot be used, and where it is required to operate at temperatures which will cause elevated pressures in the liquid part of the mixture.

The present invention is an advancement in the art as compared to WO/9836826 in that a set of vessels are removably secured within associated bores defined by a base. The vessels are constructed of material that is inert in the reactions or treatments conducted within a synthesis zone including a pressure and temperature conditions as may occur when using and substrate or base in any form from simple plate to a multi autoclave. The vessels, being each a single unit, line the interior of the bores, both the interior walls and one end. The vessels allow for a simple means of extracting material from the multiautoclave and can then be replaced with fresh vessels to minimize cross contamination between runs using the vessels. Optionally, the vessels may be used in the weighing of reagents such as powders and liquids for increased accuracy. Others have employed a liner in specific single vessel units such as U.S. Pat. No. 4,554,136 A where a fluoropolymer lining is used to inhibit acid corrosion of the walls of the pressure vessel, U.S. Pat. No. 3,048,481 A which discloses a refractory lining used within a synthesis gas generator, and U.S. Pat. No. 3,396,865 A which teaches a synthesis pressure vessel having a thermally conductive pressure shell and a chemically resistant thermally insulating lining within the shell made of a dense refractory concrete. The present invention, however, is unique in its use of a set of vessels to facilitate solid product removal and minimize cross contamination between runs using the array of vessels.

SUMMARY OF THE INVENTION

The invention allows the making of arrays of materials in quantities suitable for research and development using vessels that are easily maintained in array during the experimentation steps and may be discarded the array once the experimentation is completed. The invention overcomes the problems of using a plurality of small vessels in a method or apparatus where the problems of adequately securing the vessels for manipulation during experimentation while also removing stuck vessels from the array are both overcome. In one form the invention introduces a component of a first material into one independent vessel through an opening in its top of the first vessel and introduces another component of a second material into a different independent vessel through its top. Both vessels are removably located about a base at different first locations. Transformation of the components in the vessels then occurs to produce different materials therein. After completion of the experiments a displacement medium simultaneously urges the vessels from their respective locations about the base for discard or reuse after any necessary cleaning. Typically at least one property of the materials from the vessels is determined either within the vessel or after recovery of the materials.

It is also possible to practice the invention without the use of a base per se by again introducing the component of first and second materials independent vessels. In this case one of the independent vessels is removably located about one opening in a framework at a one location and another of the independent vessels is removably located about another opening in the framework at a different location. The vessel and framework locations permit contact by the framework with a portion of each vessel. In this form the invention also provides a unique trapping surface for contact with a different portion of each of the vessels when in their framework locations. Urging the trapping surfaces in unison into contact with the vessels create trapping contact between the vessels and the framework thereby fixing the location of the vessels relative to the framework for the manipulation of the arrays during the steps of experimentation. The components in the vessels are transformed to produce materials for experimentation in the desired array using one or more steps. After the steps, urging the first and second trapping surfaces out of contact with the first and second vessels permit ready withdrawal of the first and second vessels from the framework. In most cases the framework will comprise provided a base with bores for receiving the vessels but the framework may simply comprise an grid of openings through which the vessels pass in part.

In another form the invention provides a method of making an array of materials by introducing at least one component of a first material into a first vessel; introducing at least one component of a second material into a second vessel; and removably securing said first vessel at first location within a first bore defined by a base and removably securing said second vessel at second location within a second bore defined by the base by interaction between a surface of each vessel and a wall of its respective bore. The components in the first vessel are transformed into the first material and the components in the second vessel are transformed into the second material. At least a portion of the first material is recovered in isolation from the second material. In one embodiment of the invention, at least the first vessel is tapered to provide the interaction between only a portion of an outer sidewall of the first vessel and the inner wall of the first bore. In a more limited embodiment of this form, at least a plurality of the bores extend completely through the base, each bore retains a vessel and the plurality of bores are closed at their distal ends to at least temporarily create a pocket by affixing a bottom closure to the base that covers the distal ends of the bores and optionally removing the bottom closure permits at least partial displacement of the vessels through either side of the bore that removably secures it. Optionally this embodiment of the invention, may provide a displacement medium in the form of a series of displacement pins affixed in pattern that aligns a pin with each distal end of the plurality of bores. After the removal of the bottom closure the pins displace the vessels from the bores by contact of an individual pin with a bottom of each displaced vessel as the pins are urged into the bores.

The invention can also comprise a unit containing a multitude of pressure vessels, also referred to as a multiautoclave. The multiautoclave has typically from 10 to 10,000 or more small, separate chambers that retain a vessel, each typically with a volume of from 0.001 to 10 ml. The multiautoclave may be composed of a base having bores that define the chambers and optionally extend completely through the base. Where the bores extend partially through the base a single plate will cover the top to maintain pressure within the vessels. When the bores extend completely through the base a set of plates will cover opposite faces of the base. Each vessel is removably secured within a bore of the base and optionally a thin laminate may be sandwiched between the base and either plate to improve the pressure seal.

DETAILED DESCRIPTION OF THE INVENTION

As summarized above, the invention is a method of making an array of materials. The method uses at least a first and second vessel. The vessels are described below in greater detail. It is preferred that a greater number of vessels be used in order to enhance the efficiency of the method. Eight, sixteen, forty-eight, ninety-six, or a greater number of vessels may be used. The number of vessels may extend into the hundreds, thousands, or ten of thousands. The vessels are removably located about a base or framework.

Figure 1:
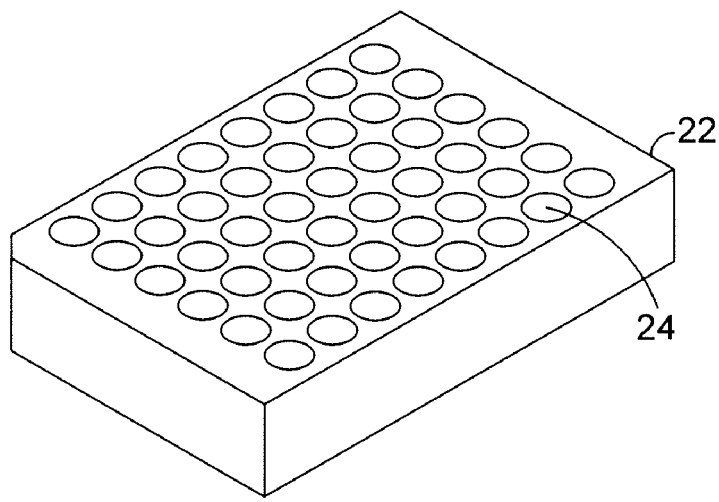
FIG. 1 is a perspective view of a base with bores.
Figure 2:
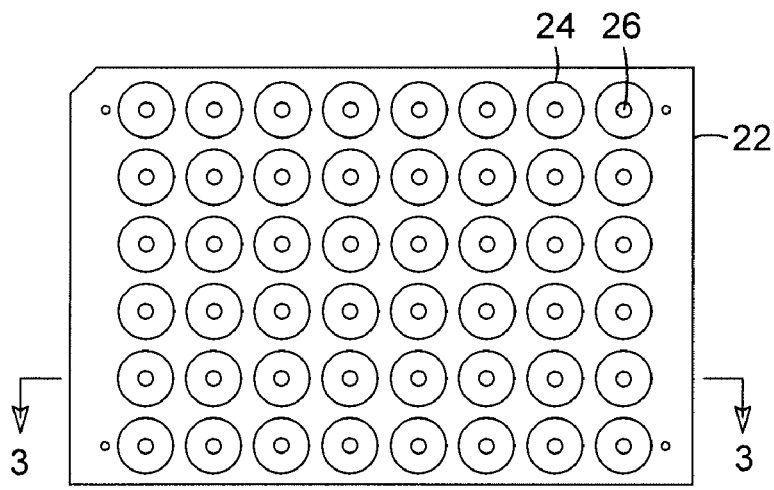
FIG. 2 is a plan view of the base of FIGS. 1 and 2.
Figure 3:
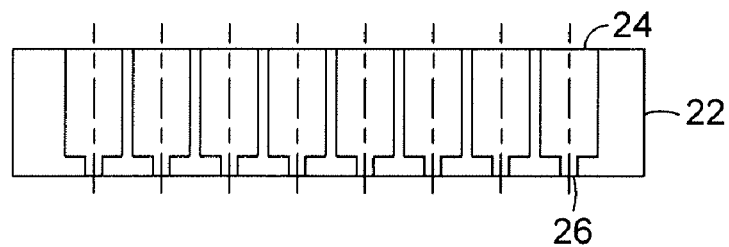
FIG. 3 is a section of the base of FIG. 2 taken along section 3-3.
Figure 4:
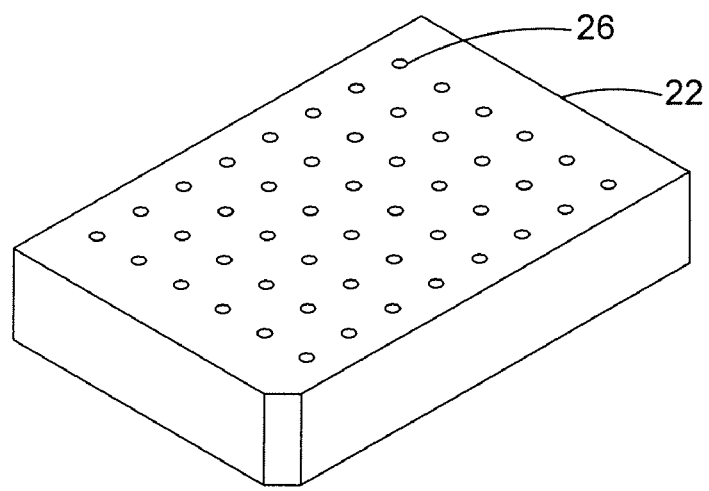
FIG. 4 is perspective view of the underside of the base of FIGS. 1-3.

FIG. 1 shows a perspective view of one embodiment of a base. The base 22 defines a multitude of bores having openings 24 in the top of the base for receiving vessels. When the base is to be used at temperatures in the range of from about 150 to about 250° C., the base may be made from stainless steel, aluminum, titanium or other rigid material such as polyethylethylketone (PEEK) or the like. For use at temperatures above 150° C., the base 22 can be made entirely of Teflon™, for use below 130° C. it can be made of polypropylene, and for use below 105° C. it can be made of polyethylene. It is preferred that the bores be through-going, or in other words, the bores extend from one surface of the base to a parallel second surface of the base. However, as can be seen in FIG. 2 the openings 24 of the bore define a passage through the thickness of base 22, but only a smaller diameter port 26 to the bottom of base 22. Port 26 provides one form of release opening for use with a displacement medium as hereinafter described. The difference in the diameter of the openings of the bores 24 and the ports 26 are shown in FIG. 3 as well as the depth of the opening 24 through the thickness of base 22. FIG. 4 shows port 26 opening in the bottom of base 22. Alternatively, the bores may define cavities that do not have an opening extending completely through the base. In general, the invention will be described below as the preferred embodiment of a base having bores with bore openings on one surface of the base and ports connecting the bore openings to another side of the base.

Figure 5:
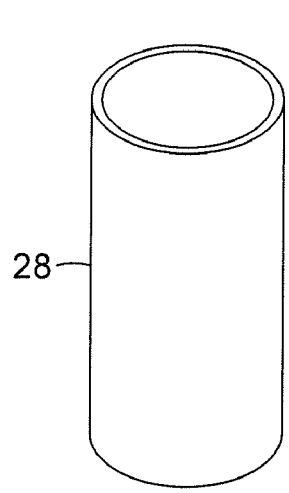
FIG. 5 is a perspective view of a vessel for use in this invention.
Figure 6:
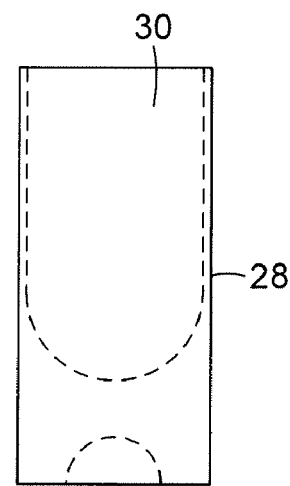
FIG. 6 is a front view of the vessel of FIG. 5.

FIG. 5 is a perspective view looking into a typical vessel 28 that occupies at least a portion of the bores in the base. The vessels may conform to the shape of the bores of the base and are positioned so that an individual vessel extends into at least one of the bore openings 24. FIGS. 5 and 6 show a cylindrically shaped vessel 28. FIG. 6 shows the outline of the interior of vessel 28 and an optional removed dimple 32 from the bottom of the vessel to aid in withdrawal of the vessel. The individual vessel lines at least a portion of the walls of the bore opening 24 and lines the bottom of the bore opening near port 26. Alternate vessels are possible and are discussed in more detail below. The vessel is preferably made of an inert polymer material such as Teflon™, polyethylene, polypropylene, perfluoroalcoxy fluorinated ethylene propylene, and polyethylethylketone, that is able to withstand the temperatures and pressures necessary for synthetic reactions. The vessels may be constructed of material that is transparent to radiation for ease of later analysis, such as transparent to infrared radiation or transparent to x-rays. However, the vessels themselves may provide a convenient way to provide catalyst function to the reaction occurring within the vessel. For example, catalyst may be present on the interior surface of the vessels, may be released from cavities within the walls of the vessels, may be released from an adsorbent that coats the walls of the vessels, and the like.

In one embodiment of the invention, materials are made in quantities suitable for research and development experiments. For example, material may be made in quantities ranging from milligrams to grams. The vessels in this application may have a maximum inner diameter of about 10 mm. Multiple vessels are used in an application, and typically, 8, 48, 96, 188 or more vessels are removably located about a base.

The vessels provide several advantages over previous equipment with the most important being the simple means of removing the vessel from the base. This allowed for a greater degree of flexibility in that different vessels may be grouped for different types of experiments. Another benefit is the ease of extracting solid products from the separate reaction vessels as compared to extracting multiple solid products from a unitary device. Yet another advantage is the significantly reduced chance of cross contamination between runs using the multiple pressure vessels. Small vessels may improve operations by eliminating the need to clean small confined regions on plates and thereby eliminating the risk of undetected contamination compromising future experiments. The individual vessel may also be used to weigh the reagents and or products to a high degree of accuracy. The vessels may also provide an alternative approach to product recovery through using ports 26 in the base 22. Vessels containing synthesis products may be pressed out of the bores of the base using an extraction device which is discussed in greater detail below.

At least one component of a first material is introduced into a first independent vessel, and at least one component of a second material is introduced into a second vessel. The components may be introduced serially to each of the vessels, or simultaneously to the respective vessels. Additional components may also be added to one or more of the vessels. Multiple components may be mixed together and added to a vessel, or may be introduced to the vessel separately. When multiple components are each introduced to a single vessel separately, the multiple components may be introduced sequentially or simultaneously. The same or differing amounts of components may be introduced to the vessels. The materials may be inorganic or organic. Preferred materials include zeolites, ceramics, composite materials and the like. The term different materials is meant to include materials produced from the same components. For example, varying the amounts of the components or the order of addition of the components, although the identity of the reactants remains the same, may results in different product materials.

Various different techniques may be used to introduce the components to the vessels, such as manual methods and automatic methods. The components are preferably introduced to the vessels in measured amounts, the measuring may be contemporaneous with the introduction, before the introduction, or after the introduction. One embodiment may use a dispenser such as a pipette, micropipette, or a powder doser. It is preferred that the dispenser be automatic, but is not necessary.

The components are transformed, while in the vessels, into materials having at least one property that is different from that of the starting component. It is expected that the transformed materials between at least two of the vessels would have at least one property that is different.

Figure 7:
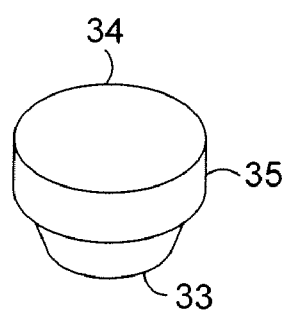
FIG. 7 is an optional cap for sealing the vessel of FIGS. 5 and 6.
Figure 8:
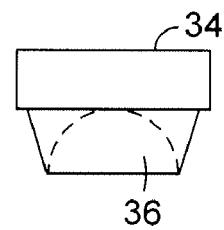
FIG. 8 is a front view section of the cap of FIG. 8.

FIGS. 7 and 8 show an optional lid that may cover the top of the vessel. FIG. 7 shows the outline of an hollowed portion 36 on the interior of a lid 34. Lid 34 may be inserted into the opening of interior portion 30 of vessel 28. Lid 34 may be shaped with a tapered end 33 to facilitate the insertion of lid 34 into interior portion 30 of vessel 28. Lid 34 may also have top portion 35 to prevent lid 34 from completely inserting within interior portion 30 of vessel 28. One purpose of lid 34 is to retain the components and materials within the vessel during handling, processing, and transformation. Another purpose of lid 34 is to provide closure of the vessel for purposes of maintaining an internal pressure such as that required for hydrothermal synthesis. Lid 34 may be constructed of materials as described for the vessel and the base above.

Figure 9:
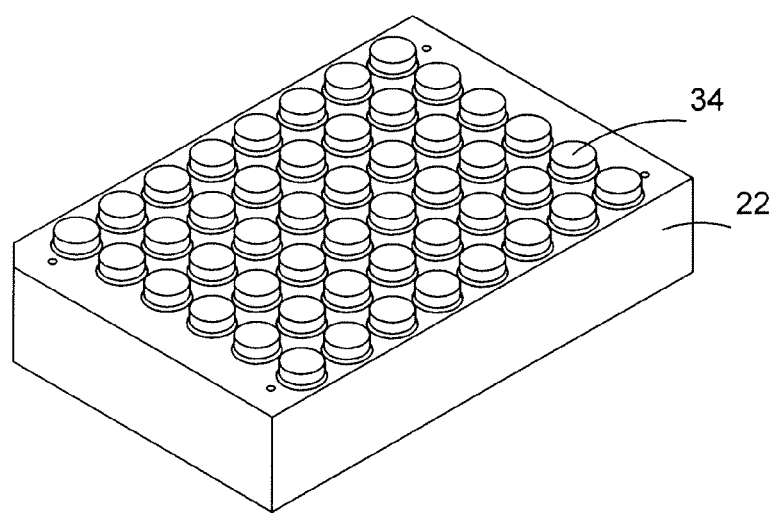
FIG. 9 is a perspective view showing the base of FIGS. 1-4 retaining a plurality of the vessels of FIGS. 5-8.
Figure 10:
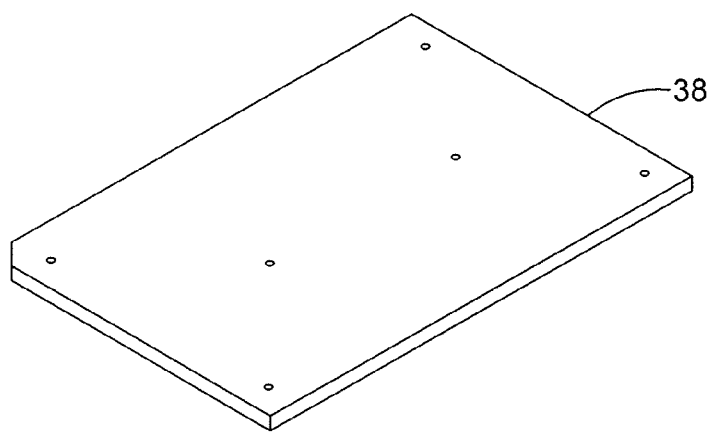
FIG. 10 is a perspective view of an optional lid for sealing the vessel and base assembly of FIG. 9.
Figure 11:
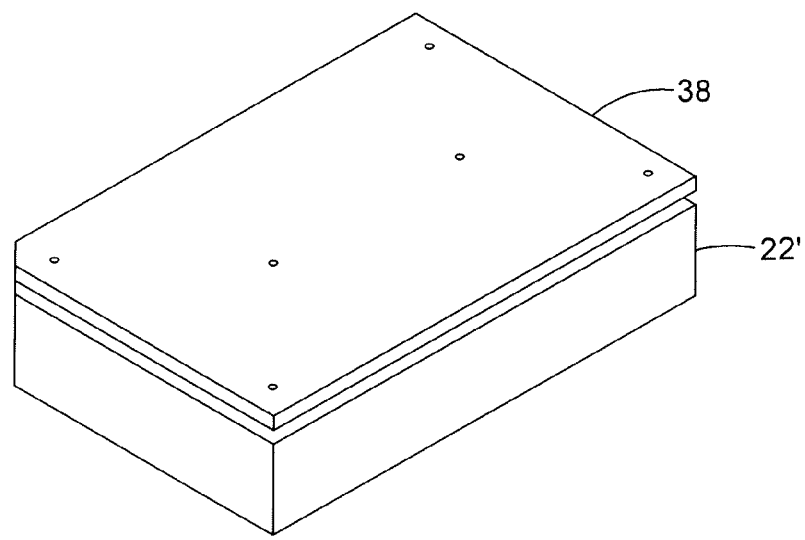
FIG. 11 is a perspective view of the assembled base and lid of FIGS. 9 and 10.

FIG. 9 shows a plurality of vessels 28 and lids 34 assembled into a base 22. and FIG. 10 shows a retaining plate 38 that contacts the lids to urge the bottom of vessels 28 into contact with the bottom of the respective bores in base 22 when assembled with the base of FIG. 9 into the assembly shown in FIG. 11. Retaining plate 38 may also operated to urge a portion of lid 34 into the interior portion of vessel 28. The lids may actually be an integral part of the retaining plate, or the retaining plate may retain a separate lid for each vessel that has a lid. The vessels 28 are removably placed within bore openings 24 defined by base 22. The vessels may be removably placed about the base before, during, or after the components have been introduced. The vessels may be removably placed about the base sequentially, at the same time, or in groups. In one embodiment, a bore contains no more than one vessel. The term about a base is meant to include within, on, or against the base.

Optionally, retaining plate 38 may be fixed to base 22 using clamps or fasteners. Threaded fasteners may operate through bores in retaining plate 38 and corresponding bores in base 22 to maintain the assembly during handling and processing.

The retaining plate serves several functions. The retaining plate in combination with the lids provide for a mechanism for independently sealing each of the vessels in order to retain materials within the vessels during mixing operations such as shaking, vibrating, stirring, tumbling, and the like. Furthermore, with each vessel being independently sealed, the components within a vessel may be mixed without resulting in cross contamination between different vessels. One possible feature of the invention employing one or more retaining plates is that a large number of assemblies may be placed on top of each other forming layers of reaction chambers according to the desired capacity. As an example, ten assemblies as shown in FIG. 11 can be placed on top of each other. The retaining plate, or the lid, or the combination of the retaining plate and the lid may also operate to provide pressure that prevents the vessels from rotational movement with respect to the base, or the retaining plate may operate to prevent the vessels from any movement with respect to the base.

Figure 17:
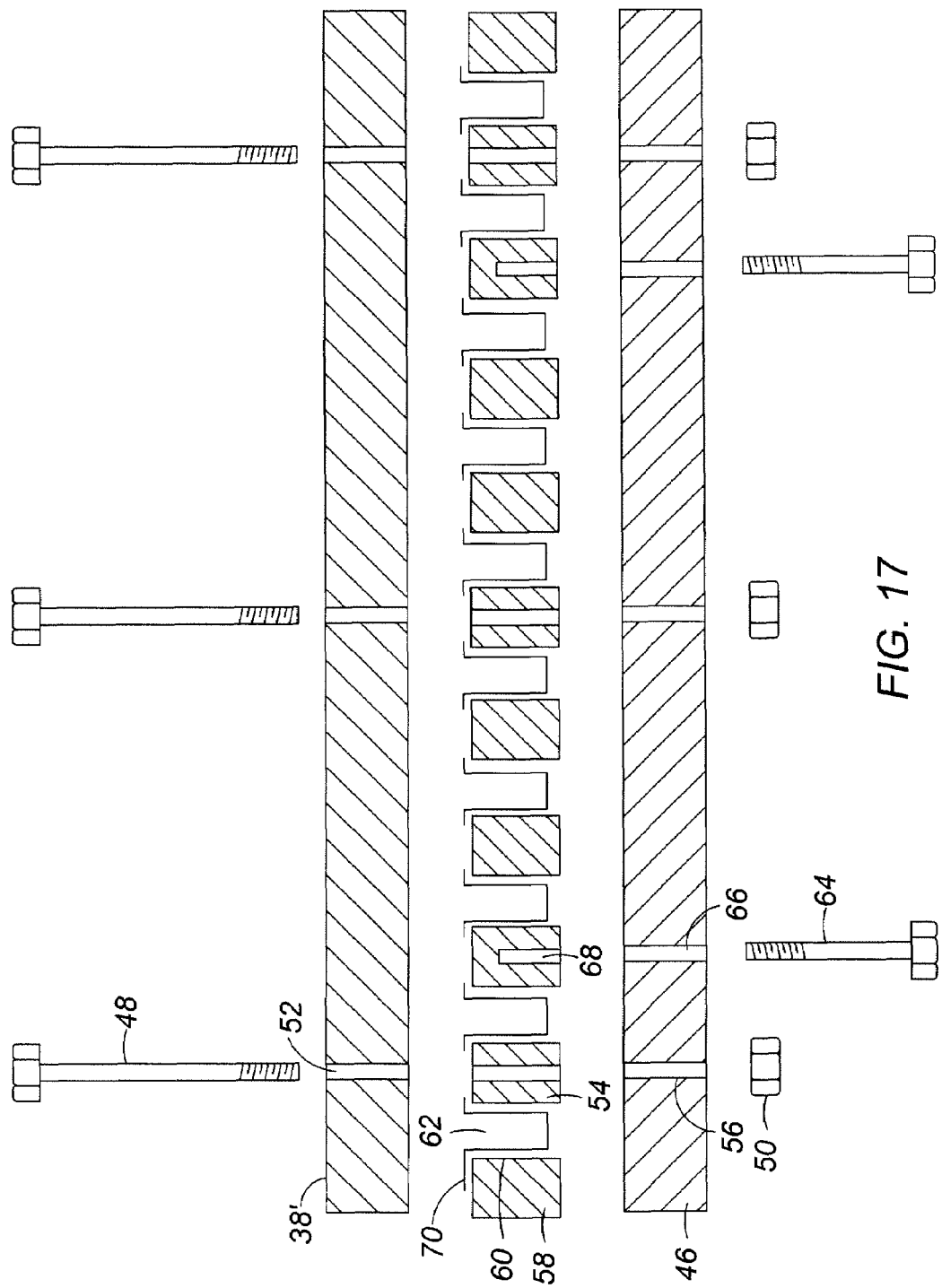
FIG. 17 is a section of alternate base, vessel and lid configuration.

FIG. 17 more completely illustrates the use of fasteners in the form of bolts 48 that extend through a hole 52 in a top retaining plate 38', a hole 54 in a base 58 that defines through going bores 60 and a hole 56 in a bottom retaining plate 46. The bolts 48 engage nuts 50 to secure the whole assembly together once vessels 62 are ready for sealing. To facilitate work with the vessels before closing retaining plate 38' optional bolts 64 may pass through holes 66 and engage a threaded hole 68 in base 58 to secure it to the base while moving the open ends of vessels 62 in base 58 to the various locations required for the experimentation steps.

The invention is suitable for use with a wide variety of base, retaining plate and vessel configurations. FIG. 17 also demonstrates the use of vessels 62 having lips 70 that extend radially outward over the top of base 58. These lips have a thickness much less than the depth of vessels 62. Securing retaining plate 38' to base 58 will squeeze lips 70 between the two contacting surfaces to provide the necessary seal to maintain pressure in vessels 62. Preferably the bolts 48 and nuts 50 are placed in such a manner and their number adjusted so that a sufficiently distributed even load is obtained in order to ensure that all the chambers are tight when in use. Additionally the squeezing mechanism may include springs or the like, which ensures the maintenance of a suitable pressure. A frame made of a rigid material that ensures good tightness in the outer chambers may enclose the entire assembly, also counteracting deformation of plates made of pure Teflon™ or another ductile material.

Figure 12:
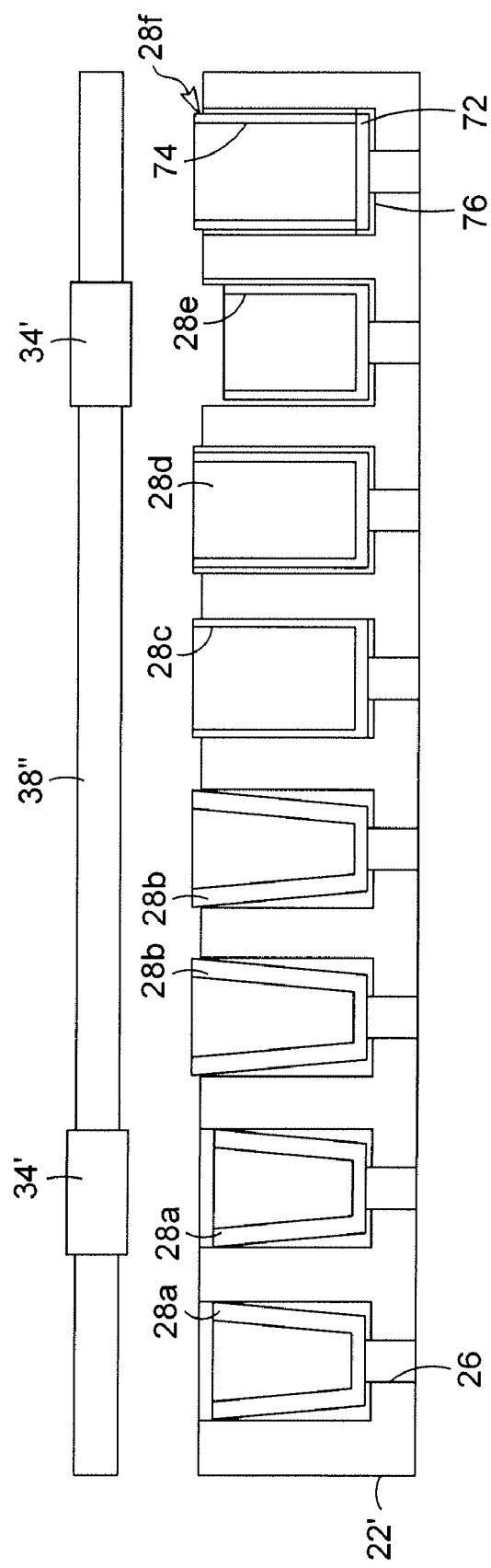
FIG. 12 is a sectional view of a base showing different vessel and optional lid configurations for use with the invention.

FIG. 12 further shows the variety of vessels that can occupy the bores and use the retaining plate as shown in FIGS. 3 and 17. At the location of each vessel 28 base 22' further defines ports 26. Retaining plate 38' retains lids 34 in various forms as described. Vessels 28a have tapered geometries where a closed end has a diameter less than that of an open end and vessels 28a and are completely contained within the bores of base 22' with the exterior surface of the open end of the vessel being in contact with the surface of the bore. Many closure arrangements can seal the tops of vessels 28a for retaining pressure. In its simplest form the underside of retaining plate 38" may provide sufficient containment contacting the proximate face of base 22' with enough force to seal the bore that retains vessel 28a. Placing a gasket or other thin layer of sealing material between the two contact surfaces of base 22' and retaining plate 38" can increase the effectiveness of the seal across the bores that retain vessels 28a. Retaining plate 38" may also provide a direct seal with the top of vessel 28a using a lid 34' integrated into retaining plate 38' and extending below its bottom surface such that the bottom of lid 34' directly contacts the rim of vessel 28a.

Vessels 28b also have tapered geometries where a closed end has a diameter less than that of an open end. Vessels 28b, while positioned within the bore, extend beyond the opening of the bore in the base. The portion of vessels 28b that extend beyond the bore 28b provide a protruding region of the vessel having an enlarged outer diameter with respect to the diameter of the bore The exterior surface of vessels 28b are in contact with the bore opening and adaptation of such contact into a suitable force-fit within the bores allows frictional forces to operate against rotation or other movement such as translational movement of the vessels during the steps of experimentation. However, the retaining plate and or lids may also be used to prevent cross contamination or to contain materials within the vessel during mixing. All of vessel 28c, 28d, 28e and 28f have a cylindrical geometry. Vessels 28c, 28d, and 28F while positioned within the bore, all extend beyond the opening of the bore in the base. Retaining plate 38" may contact the tops of any or all of these vessels to prevent their movement within bore and if desired provide a pressure seal between the rim of the vessels and the underside of retaining plate 38". Although not required, any of the cylindrical vessels may be force-fit within the bores as described above for the tapered vessels in order to restrict against rotation or other movement. For example Vessel 28c may undergo a slight force-fit with the base 22' when inserted in a bore to maintain its position. Vessel 28d may fit relatively loosely into its respective bore and relies on contact with surface of retaining plate 38" to keep it positioned within base 22'. Vessel 28f is a two-piece vessel comprised of a bottom disk 72 in combination with a detachable side wall in the form of a sleeve 74. The sleeve 74 rests on an at least partially closed bottom 76 of the bore. Pressure from retaining plate 38" against the top of sleeve 74 urges it into contact with disk 72 so that sidewall section and bottom section function as a unitary vessel while optionally provided a seal at the top of sleeve 74 with the underside of retaining plate 38".

As with the unitary vessels, vessel 28f may be contained within the bore, or may extend beyond the bore as shown. As depicted the bore of base 22' completely contains vessel 28e such that adjacent lid 14' is partially inserted within the bore to contact the rim of vessel 28e.

Figure 13:
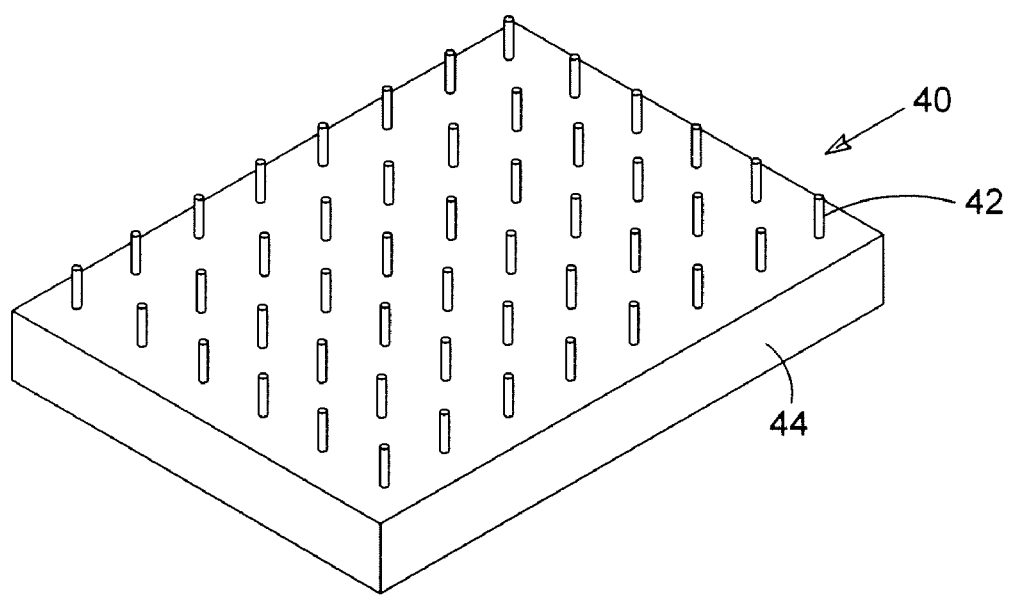
FIG. 13 is a perspective view of a displacement medium comprising a jig and aligned pins.

Using any vessels, force-fitting of vessels, addition of components to vessels, deformation of vessels undergoing sealing, exposure to pressure and temperature conditions under experimentation, and other procedures will create the need to extract the vessels from the base. Vessels lodged within a bore may be extracted from the base using a displacement medium. One form of such a medium is an extraction tool such as that shown in FIG. 13. Extraction tool 40 has a jig 44 for positioning pins 42 in alignment with ports 26 of the bores or through going bores 60 in order to disengage the vessels from the bores. Extraction tool 40 provides for simultaneous disengagement of the vessels from the bores. In one embodiment of the invention, extraction occurs by placing a base of the type shown in FIG. 14 or 17 that contains vessels 28 or 62 within the bores over the extraction tool and forcing it downward so that pins 22 enter either the open bore or ports 26 and contact vessels 62 and 28. Continued force would result in disengagement of the vessels from the bores of the base.

Many alternate forms of a displacement medium for removing more than one vessel at a time from the bores are within the scope of the invention. For example, another form of mechanical displacement medium could manually mechanically seize at least a portion of several vessel about a surface of each vessel to withdraw the seized vessel from its bore. If the vessel is formed of relatively soft material such extractor could use an array of hooks or puncturing devices to penetrate an interior or exterior surface of individual vessels as moves toward the block and then simultaneously remove the engaged vessels as it is withdrawn. Other forms of mechanical displacement mediums may engage a lip, tab other member on the vessel to withdraw it from the base. For instance a series of thin members may slide under the lip 70 of the vessels as shown in FIG. 17. In one form such a removal device can simply comprise an extractor in the form of a flat plate with enlarged openings that fit around the outer edges of lips 70 and of suitable thinness to slide under the lips 70 when urged against them for lifting of the vessels from the base with the plate. Such a surface fluidic or electro mechanical displacement medium may also find use in this invention. For example with the use of ferrous vessels a magnetic field may provide the displacement medium to attract or repel the vessels from a block. More simply the displacement medium can comprise a compressed gas such as air delivered to one side of through going bores 60 or ports 26. An open chamber sealed around the bottom perimeter of a block 22 may deliver the air. Alternately, an additional block 22 in the form of that shown in FIG. 4 may serve as manifold which when in bottom side to bottom side contact with a similar block 22 delivers compressed gas out of its ports 26 and into corresponding ports 26 of the similar block to blow the vessels from the bores that retain them. Similarly the a block 22 can serve as a vacuum manifold by placing its bottom over the top of a similar block 22 that retains vessels and drawing a vacuum between the individual vessels and the ports 26 as the two block are maintained in at least partially sealed contact. Drawing the vacuum can either merely dislodge the vessels extraction by an additional displacement medium or maintaining the vacuum between individual vessels and ports 26 may allow complete withdrawal of the vessels with removal of the block 22. Thus the displacement medium can comprise any effective force delivered to the vessels to effect displacement of withdrawal of more than one vessel at a time.

Figure 14:
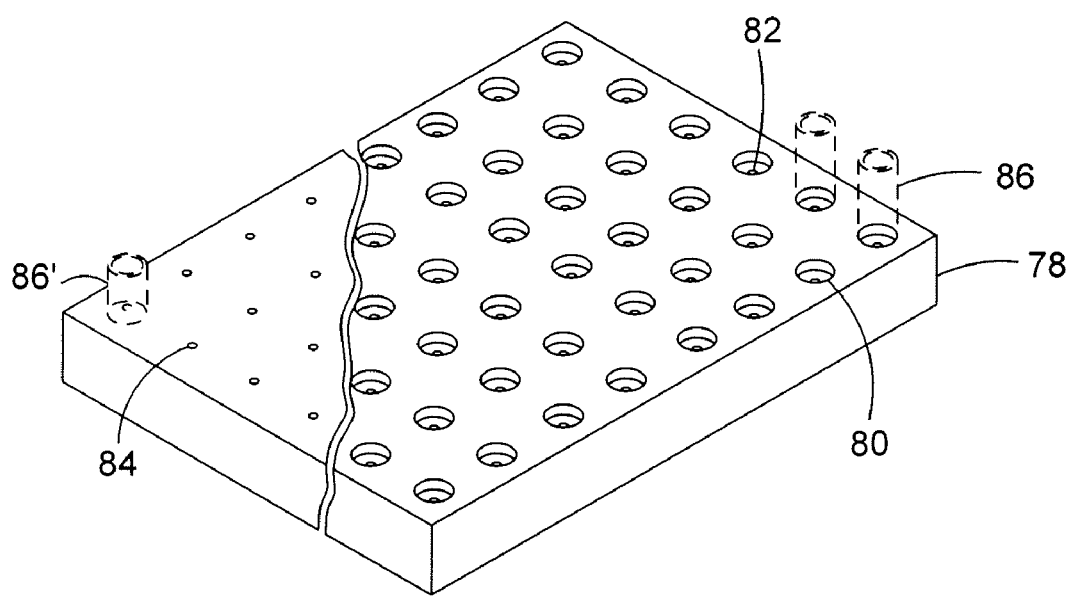
FIG. 14 is perspective view of an alternate base configuration having shallow bores.
Figure 15:
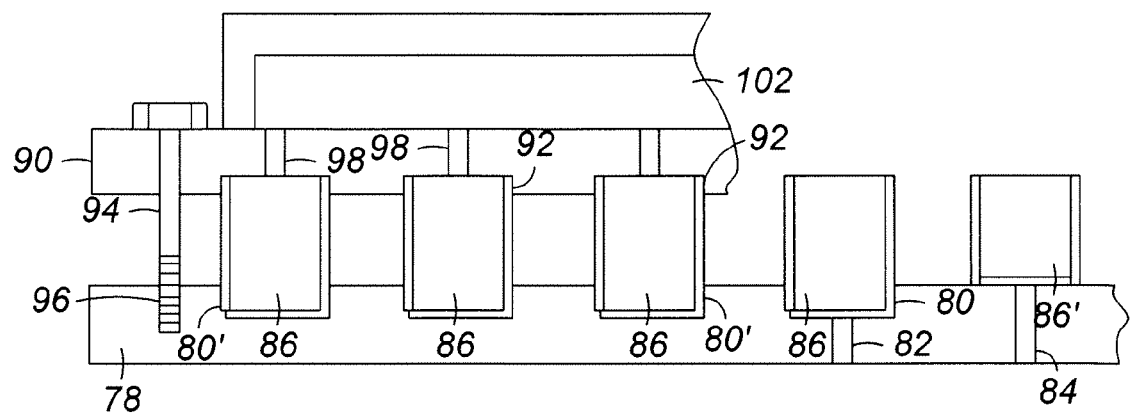
FIG. 15 is section representative of the base of FIG. 14 having vessels therein and an optional lid configuration.
Figure 16:
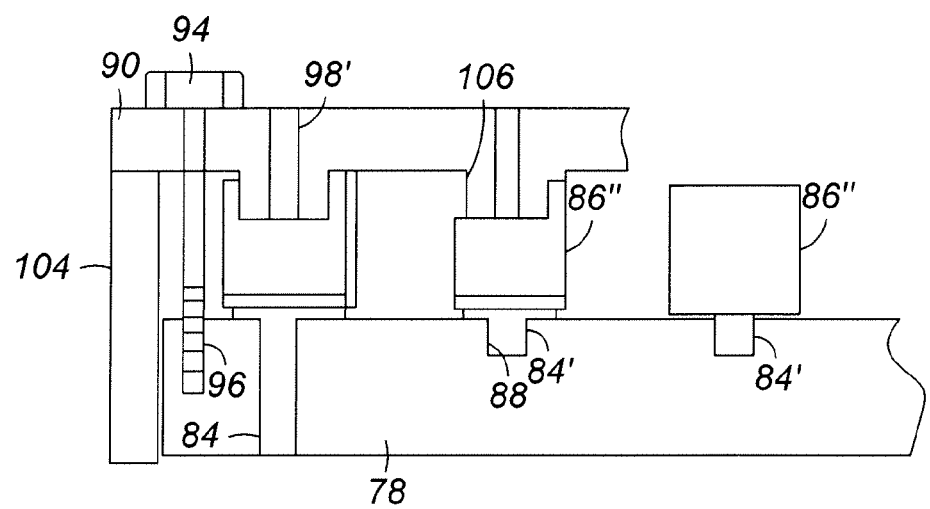
FIG. 16 is a section showing an alternate arrangement for the base section of FIG. 15.

The array of vessels need not extend significantly into a bore or into a bore at all to utilize this invention. FIGS. 14-16 illustrate shallow depressions 80 with optional holes 82 or simply holes 84 on different regions of base 78. Depressions 80 and holes 84 can retain the vessels 86 or 86' (shown in outline) in place on the regions. The size of holes 80 may permit a force fit with the outside wall of vessel 86 to retain the vessels on the plate. Blowing compresses gas through the optional holes 82 can again serve as a displacement medium to eject the vessels 86 from depressions 80. Alternately placing vessels 86 with a relatively loose fit into the depressions 80 and then drawing and maintaining a vacuum through the optional holes 82 can provide the retaining force for the vessels. In such an arrangement releasing the vacuum through holes 82 also releases the vessels such that the absence of the vacuum serves as the displacement medium. The use of the vacuum displacement medium can eliminate the need for depression 80 altogether where sufficient retention is possible by merely drawing the vacuum through holes 84 to create enough force to retain vessel 86' directly on the surface of base 78.

To use another form of displacement medium the vessels 86 or 86' can comprise a ferrous material and the area of holes 82 or 84 can serve as point contacts in an array of electro-magnets that can contain vessels 86 or 86' on the base until release of the vessels by de-energizing the magnets. In another embodiment base 78 can comprise one large electromagnet for retaining ferrous vessels that thereby eliminates the need for any holes or depressions.

FIG. 15 shows a section that further illustrates all of the foregoing description of the vessel and base interaction along with additional forms of displacement mediums. On the far right FIG. 15 shows a vessel 86' retained on the top of the base 78 by connection with a source of vacuum through hole 84. Next, to the left in FIG. 15 a vessel 86 resides in a depression 80. Again vessel 86 may have a force-fit with depression 80 in which case hole 82 can accommodate a mechanical or pneumatic displacement medium to force vessel 86 and several similarly situated vessel from depression 80 when desired. Alternately vessel 86 may fit relatively loosely into depressions 80' not having optional hole 82 retains vessels 80 in a force fit as previously described and hole 86 may retain the vessel 86 selectively in place through vacuum or other means. An offset retaining plate 90 contacts the top of the vessels 86 and retains them in depressions 92. Securing offset retaining plate 90 by threading bolt 94 into threaded hole 96 of base 78 provides additionally stability to the base and vessel assembly for transport vessels and/or agitation of the materials contained therein and can also provide sealing of the vessels for pressure operations. Retaining plate 90 in combination with the depressions 92 may provide another form of mechanical displacement medium when unbolted from base 78 by using the plate 90 to simultaneously tip two or more of vessels out of depressions 80' thereby eliminating the need for any other displacement medium.

In a similar manner to that just described it is also possible to use the same displacement medium for removing relatively rigid vessels from a relatively pliant and preferably elastic base wherein the base permits most of any necessary deformation to retain the vessels in a force-fit. Release of the vessels, in this instance while possible using many of the different displacement mediums as already described, may again simply rely on engagement and tipping of the vessels from the base using a grid for simultaneous contact of the vessels. A framework 120 or trapping plate 108 as later described are examples of such grids that can engage the tops of the vessels for tipping from the base.

Retaining plate 90 may also include ports 98 for communicating fluids with the vessels 86. A plenum 100 brazed or welded in place over the top of retaining plate 90 can provide a sealed chamber 102 for communicating or evacuating fluids from vessels 86. By pulling a vacuum in the chamber 102 retaining plate can serve as a vacuum for of displacement medium that permits simultaneous lifting of the vessels 86 from the depressions 80'. The chamber 102 can also deliver fluids for treatment or testing of the materials in the vessels 86. Plenum may be divided as with individual piping to each divided area to provide any number of different fluids to groups of vessels 86 or even individual vessels 86.

FIG. 16 provides another alternate arrangement for situating vessels 86" directly on the top of the base 78. Vessel 86" have posts 88 depending form their bottoms for insertion into hole 84 that extends completely through base 78 or hole 84' that extends partially into the base. Post 88 may engage holes 84 or 84' in a force fit or a loose fit for ejection of the post by mechanical pneumatic or other displacement medium in the case of a force-fit and retention by vacuum, magnetic or other retention methods susceptible to selective de-energizing. Again a retaining plate 90' may secure the vessels more firmly to the base by use of a bolt 94 and a threaded hole 96. The addition of guide plate 104 for engagement with the sides of base 78 can further improve stability enhancing function of retaining plate 90. Retaining plate 90' in combination with stubs 106 that depend from its underside into vessels 86" can provide another form of mechanical displacement medium when unbolted from base 78 by using the plate 90' to simultaneously tip the posts from two or more of vessels out of holes 84 or 84'. Retaining plate 90' may also include ports 98' for communicating fluids or solids with the vessels 86 and may again use a plenum in communication with the ports 98'.

Figure 18B:
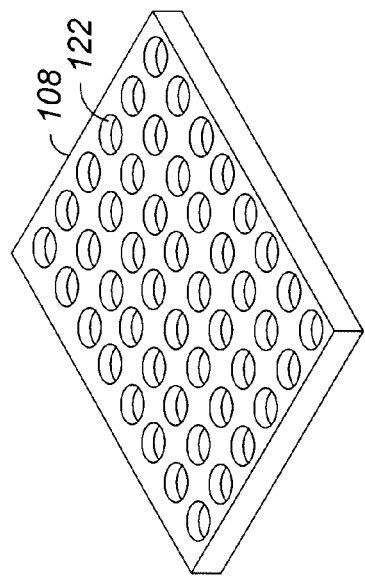
FIG. 18b is a perspective view of the trapping surfaces of FIG. 18 isolated from the assembly of FIG. 18.
Figure 18C:
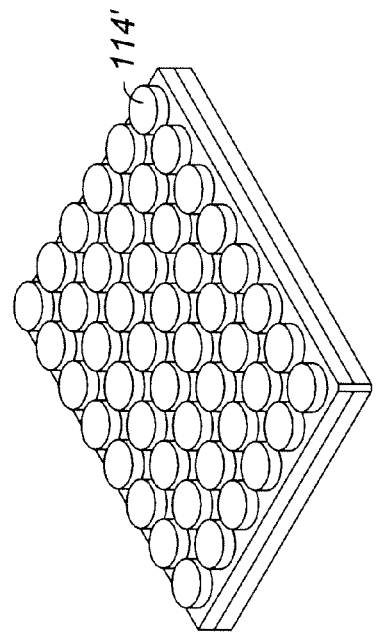
FIG. 18c is a perspective view of the framework of FIG. 18 isolated from the assembly of FIG. 18 and retaining vessels.
Figure 18A:
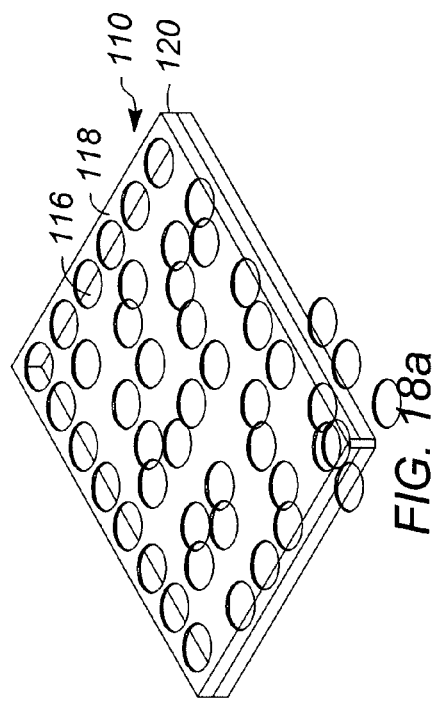
FIG. 18a is a perspective view of the framework of FIG. 18 isolated from the assembly of FIG. 18.
Figure 18:
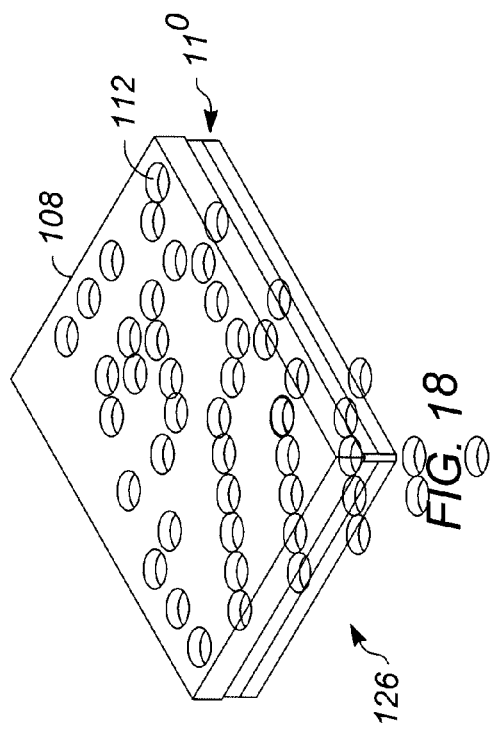
FIG. 18 is a perspective view showing an assembly of a framework and with trapping surfaces to retain vessels and effect their simultaneous withdrawal.

FIGS. 18, 18a, 18b, and 18c illustrate another embodiment of the invention that uses the release of a mechanical retaining device to provide the displacement medium. FIG. 18 shows an assembly 126 of a trap plate 108 having trapping surfaces in the form of holes 112 positioned over a framework 110 for movement of the trapping surfaces in unison. As shown in FIG. 18a framework 110 comprises an array holes 116 in a flat plate 118 supported by sidewalls 120. FIG. 18 c show vessel 114' occupying all of the holes in the 116 in framework 110. Holes 116 have a loose fit for contact with a portion of the sidewalls of the vessels. The size of the holes permits their ready insertion and withdrawal from framework 110. Framework 110 can have a hollow interior as depicted in FIG. 18a or may comprise a solid block with bores that extend partially or completely through the base. Ordinarily framework 110 will have a bottom plate to prevent the vessel from dropping completely through holes 116. To complete the assembly plate 108 rests on top of framework 110 and vessels 114' extend through holes 112 that are sized to fit readily over the vessels for contact with a portion of the vessel sidewalls.

Figure 19:
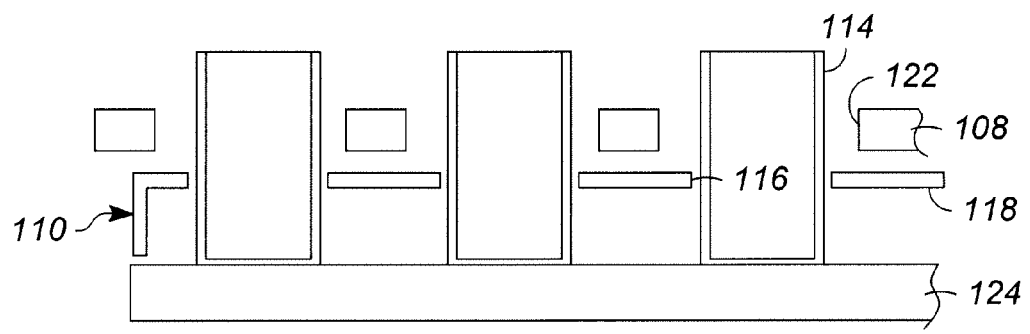
FIG. 19 is section representative of FIG. 18 with the trapping surfaces in a first position relative to the framework.
Figure 20:
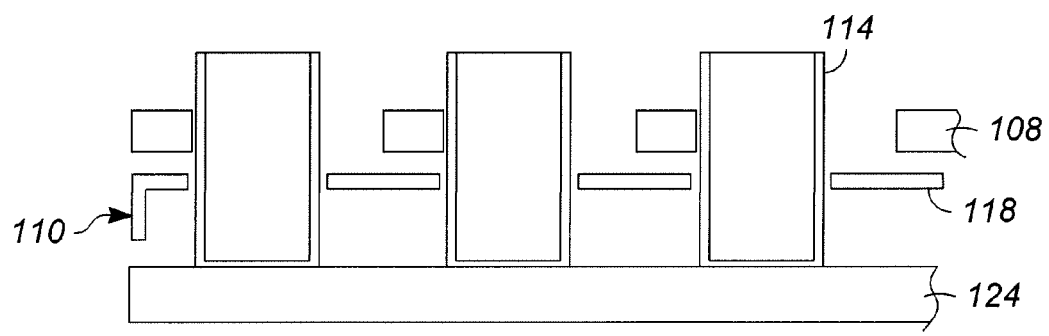
FIG. 20 shows the trapping surfaces of FIG. 19 in a second position relative to the framework.

FIGS. 19 and 20 show the relative positioning of framework 110 and trapping plate 108 during for the retention and release of the vessels 114'. FIG. 119 shows the release position where the holes 122 of trapping plate 108 align in a relatively concentric manner with respect to holes 116 of framework 110 to permit ready insertion and withdrawal of vessels 114'. Positioning framework 110 and plate 108 in this manner allows insertion of the vessels 114' into assembly 126 individually or collectively through holes 122 and 116. As the vessels 114' are dropped into the assembly they rest on an optional retaining plate. Simultaneous withdrawal of multiple vessels 114' from the assembly 126 is effected by either withdrawing the bottom plate 124 or lifting the assembly 126 to leave the vessels 114' on the bottom plate 124. The effectiveness of the pinching action of plate 108 and framework 110 in retaining vessels 114' allows enlarging sizing of holes 122 and 116 that eliminates adhering or sticking of the vessels 114' within assembly 126 when it is positioned for release of the vessels as shown in FIG. 19.

After insertion of the vessels 114' into the assembly as shown in FIG. 19, positioning plate 108 and framework 110 in the relative positions shown in FIG. 20 will retain the vessels in the assembly 120 for moving of the vessels during the different steps of experimentation. With vessel 114' in place, sliding plate 108 to align holes 122 in an eccentric arrangement relative to holes 116 causes trapping surfaces provided by edges of holes 116 to simultaneously contact portions of the vessel 114' on one side while on the opposite sides of the vessels opposing trapping surfaces provided by edges of a holes 122 while simultaneously contact portions of the vessels on an opposite and at a slightly higher point on the vessels. The assembly can employ any suitable clamp detent to hold the relative positions of plate 108 and framework 110 in the trapping position until the desired release or removal of vessels 114' from the array.

The steps used in the transformation of the component or components contained by the vessels may be any of those commonly known in the art. Heat may be applied, stirring, mixing, agitation, hydrothermal conditions, and the like. Multiple steps may be employed, or a single step may be used, for example, it is often desirable to calcine inorganic samples after synthesis. Washing, grinding, and sieving are additional optional steps. Different components may be added between transformation steps. The materials formed may be further process or analyzed using different techniques and are not required to be treated as an array. The materials are retained in the defined matrix that, in a simple manner, can be transferred to an automatic sample-switching unit for analysis, e.g., by X-ray diffraction or IR thermography.

An added advantage of using the independent vessels is that the base is ready to be used again with no or only minimal cleaning. Residue from the previous reactions is removed in the vessels and the base is virtually residue-free for subsequent synthesis reactions. The overall benefits of the advances in the present invention are primarily related to the increase in efficiency in removing the synthesized materials, the reduction in cross contamination, and the increase in efficiency in preparing the apparatus for subsequent use. Advances in the automated layout will make it possible to more efficiently perform large numbers of syntheses/formulations simultaneously, and it will thus be very useful for all research laboratories in industry as well as in research institutions/universities.

What is claimed is:

1. A method of making an array of materials in quantities suitable for research and development experiments comprising:
   a) introducing at least one component of a first material into an independent first vessel through a top opening of the first vessel;
   b) introducing at least one component of a second material into an independent second vessel through a top opening of the second vessel;
   c) removably locating said independent first vessel about a base at a first location and removably locating said independent second vessel about the base at a second location wherein the base provides a plurality of bores adapted to receive a plurality of vessels at least partially within the bore, each bore has a release opening at an end opposite the end of the bore that receives the vessel and the application of a displacement medium into one end of each bore at least partial ejects a plurality of the vessels from the opposite end of the bore for removal of at least a portion of the vessels from the base;
   d) transforming the component(s) in the first vessel into the first material and transforming the component(s) in the second vessel into the second material;
   e) determining at least one property of at least a portion of the first material in isolation from the second material; and,
   f) contacting the first and the second vessel with the displacement medium that simultaneously urges the first and second vessels from their respective first and second locations wherein the displacement medium comprises a release jig having a plurality of displacement pins affixed in pattern that aligns at least one pin with an open end of each bore and contact of each vessel with at least one pin at least partially ejects that respective vessel from the bore.

2. The method of claim 1 wherein the vessels have a maximum inner diameter of 10 mm.

3. The method of claim 1 wherein at least 8 vessels are removably located about the base.

4. The method of claim 3 wherein the displacement medium simultaneously urges less than 8 of the vessels from their respective locations at any one time.

5. The method of claim 1 wherein each vessel receives at least two components of material prior to the transformation of components into a material and after the transformation of the components the first and second materials have at least one difference in their properties.

6. The method of claim 1 wherein the first and second vessels have a principal axis in an at least partial vertical alignment during introduction of the one component of the first material and one component of the second material, the first vessel is engaged against translation in either direction along its principal axis at the first location, and the second vessel is engaged against translation in either direction along its principal axis at the second location.

7. The method of claim 1 wherein the first and second vessels have a principal axis in an at least partial vertical alignment during introduction of the one component of the first material and one component of the second material and wherein the first and second vessels are engaged against rotation around its respective principal axis with respect to the base.

8. The method of claim 1 wherein a lid covers an open end of at least one of the vessels and urges the vessel into contact with a surface of the base to engage the vessel against rotation or against translation with respect to the base.

9. The method of claim 1 wherein at least a plurality of vessels each have a lid and a retaining plate urges the lids toward their respective vessels.

10. The method of claim 9 wherein the retaining plate retains a separate integral lid for each vessel that has a lid.

11. The method of claim 1 wherein at least a portion of an interior surface of the vessel comprises a catalytic material.

12. The method of claim 11 wherein the first vessel and the second vessel receive the same component and the catalytic material provided by the first vessel and the catalyst material provided by the second vessel influence the transformation of the components to produce at least one difference in the properties of the first material and the second material.

13. The method of claim 1 wherein at least a portion of the vessels are engaged against displacement in any direction and rotation about any axis.

14. The method of claim 1 wherein at least one of the vessels has a protruding lip encircling its outer diameter having a thickness less than the depth of the vessel.

15. The method of claim 14 wherein one surface of the lip rests on a surface of the base and an opposite surface of the lip is contacted by a lid that seals the interior of the associated vessel.

16. The method of claim 1 wherein each vessel receives at least two components prior to the transformation of components into a material within each vessel and after the transformation the first and second material have at least one difference in their properties.

17. The method of claim 1 wherein at least the first vessel receives at least one component of its respective material before it is located about the base and preferably a plurality of the vessels receive two or more components of material before they are placed at their locations about the base.

18. The method of claim 1 wherein one or more materials are deposited into a vessel and vessels containing one or more materials are serially inserted into bores of the base.

19. The method of claim 1 wherein the first vessel over at least the portion received by the bore has at least one region sized to interfere with a wall of the bore and force fitting of that vessel region into the that bore engages the vessel with the base.

20. The method of claim 19 wherein the one region sized to interfere comprises at least a portion of the vessel having an enlarged outer diameter with respect to the diameter of the bore and preferably the first vessel is tapered to provide the enlarged outer diameter over a portion of the outer surface of the first vessel.

21. The method of claim 1 wherein the base defines bores having at least partially closed bottoms, the first vessel comprises a bottom section and a detachable sidewall section, the bottom section contacts the bottom of the bore, the side wall section contacts the sidewall section, and the sidewall section and the bottom section are urged into contact to so that sidewall section and bottom section function as a unitary vessel.

22. The method of claim 1 wherein at least a plurality of the bores extend completely through the base, each bore retains a vessel and the plurality of bores are closed at their distal ends to at least temporarily create a pocket by affixing a bottom closure to the base that covers the distal ends of the bores and optionally removing the bottom closure permits at least partial displacement of the vessels through either side of the bore by the displacement medium.

23. The method of claim 1 wherein the first vessel is formed of a relatively rigid material and the base if formed of relatively elastic material and the vessel and vessel is fixed with respect by urging the vessel into an interference fit with the base that deforms the base.

24. A method of making an array of materials in quantities suitable for research and development experiments comprising:
a) introducing at least one component of a first material into an independent first vessel through a top opening of the first vessel;
b) introducing at least one component of a second material into an independent second vessel through a top opening of the second vessel;
c) removably locating said independent first vessel about a base at a first location and removably locating said independent second vessel about the base at a second location wherein the base provides a plurality of bores adapted to receive a plurality of vessels at least partially within the bore, each bore has a release opening at an end opposite the end of the bore that receives the vessel and the application of a displacement medium into one end of each bore at least partial ejects a plurality of the vessels from the opposite end of the bore for removal of at least a portion of the vessels from the base;
d) transforming the component(s) in the first vessel into the first material and transforming the component(s) in the second vessel into the second material;
e) determining at least one property of at least a portion of the first material in isolation from the second material; and,
f) contacting the first and the second vessel with the displacement medium that simultaneously urges the first and second vessels from their respective first and second locations wherein the displacement medium comprises an extractor that simultaneously removes the first and second vessels from their respective bores by engagement with at least a portion of the vessels for simultaneous removal of the vessels from an open end of the bore and wherein the extractor comprises a plurality of vacuum ports aligned with one or more of the bores, a surface of the extractor contacts at least a portion of the vessel surface in at least partially sealed communication to effect a pressure reduction within the vessels when extractor communicate a pressure reduction to a plurality of the vacuum ports, such that the extractor is positioned with respect to base to seize a plurality of the vessels by creating an at least partial vacuum, and the extractor withdraws the plurality of vessels as the extractor is displaced from the base.

25. A method of making an array of materials in quantities suitable for research and development experiments comprising:
a) introducing at least one component of a first material into an independent first vessel through a top opening of the first vessel;

b) introducing at least one component of a second material into an independent second vessel through a top opening of the second vessel;

c) removably locating said independent first vessel about a base at a first location and removably locating said independent second vessel about the base at a second location wherein the base provides a plurality of bores adapted to receive a plurality of vessels at least partially within the bore, each bore has a release opening at an end opposite the end of the bore that receives the vessel and the application of a displacement medium into one end of each bore at least partial ejects a plurality of the vessels from the opposite end of the bore for removal of at least a portion of the vessels from the base;

d) transforming the component(s) in the first vessel into the first material and transforming the component(s) in the second vessel into the second material;

e) determining at least one property of at least a portion of the first material in isolation from the second material; and, f) contacting the first and the second vessel with the displacement medium that simultaneously urges the first and second vessels from their respective first and second locations wherein the displacement medium is compressed gas and application of the compressed gas to one side of the base communicates the compressed gas to the release openings and at least partially ejects a plurality of the vessels from the base.

26. The method of claim 25 wherein at least 8 vessels are removably located about the base.

27. The method of claim 26 wherein the displacement medium simultaneously urges less than 8 of the vessels from their respective locations at any one time.

28. The method of claim 25 wherein each vessel receives at least two components of material prior to the transformation of components into a material and after the transformation of the components the first and second materials have at least one difference in their properties.

29. The method of claim 25 wherein a lid covers an open end of at least one of the vessels and urges the vessel into contact with a surface of the base to engage the vessel against rotation or against translation with respect to the base.

30. The method of claim 25 wherein at least a plurality of vessels each have a lid and a retaining plate urges the lids toward their respective vessels.

31. The method of claim 30 wherein the retaining plate retains a separate integral lid for each vessel that has a lid.

32. The method of claim 25 wherein at least a portion of an interior surface of the vessel comprises a catalytic material.

33. The method of claim 32 wherein the first vessel and the second vessel receive the same component and the catalytic material provided by the first vessel and the catalyst material provided by the second vessel influence the transformation of the components to produce at least one difference in the properties of the first material and the second material.

34. The method of claim 25 wherein at least a portion of the vessels are engaged against displacement in any direction and rotation about any axis.

35. The method of claim 25 wherein each vessel receives at least two components prior to the transformation of components into a material within each vessel and after the transformation the first and second material have at least one difference in their properties.

36. The method of claim 25 wherein at least the first vessel receives at least one component of its respective material before it is located about the base and preferably a plurality of the vessels receive two or more components of material before they are placed at their locations about the base.

37. The method of claim 25 wherein one or more materials are deposited into a vessel and vessels containing one or more materials are serially inserted into bores of the base.

38. A method of making an array of materials in quantities suitable for research and development experiments comprising:

a) introducing at least one component of a first material into an independent first vessel through a top opening of the first vessel;

b) introducing at least one component of a second material into an independent second vessel through a top opening of the second vessel;

c) removably locating said independent first vessel about a base at a first location and removably locating said independent second vessel about the base at a second location, wherein the base provides a plurality of bores adapted to receive a plurality of vessels in a force fit, each bore has a vacuum opening at an end opposite the end of the bore that receives the vessel and a vacuum applied through the vacuum port to at least a portion of an outer surface of the first vessel urges the first vessel into engaging contact with the surface of the base;

d) transforming the component(s) in the first vessel into the first material and transforming the component(s) in the second vessel into the second material;

e) determining at least one property of at least a portion of the first material in isolation from the second material; and, f) contacting the first and the second vessel with a displacement medium that simultaneously urges the first and second vessels from their respective first and second locations.

* * * * *